Nov. 9, 1971 A. C. BARBER ET AL 3,618,205

METHOD OF FABRICATING A COMPOSITE SUPERCONDUCTING WIRE

Original Filed April 18, 1968 2 Sheets-Sheet 1

INVENTORS
ANTHONY CLIFFORD BARBER
LAURENCE REGINALD HAWTIN
PETER HARLOW MORTIN
BY
Cushman, Darby & Cushman
ATTORNEYS

METHOD OF FABRICATING A COMPOSITE SUPERCONDUCTING WIRE

Original Filed April 18, 1968 2 Sheets-Sheet 2

INVENTORS
ANTHONY CLIFFORD BARBER
LAURENCE REGINALD HAWTIN
PETER HARLOW MORTON

By Cushman, Darby & Cushman
ATTORNEYS

United States Patent Office 3,618,205
Patented Nov. 9, 1971

3,618,205

METHOD OF FABRICATING A COMPOSITE SUPERCONDUCTING WIRE

Anthony Clifford Barber, Lichfield, Laurence Reginald Hawtin, Birmingham, and Peter Harlow Morton, Solihull, England, assignors to Imperial Metal Industries (Kynoch) Limited, Birmingham, England Original application Apr. 18, 1968, Ser. No. 722,475. Divided and this application June 6, 1969, Ser. No. 857,245
Claims priority, application Great Britain, Apr. 27, 1967, 19,378/67
Int. Cl. H01v *11/00;* B23p *17/00*
U.S. Cl. 29—599 7 Claims

ABSTRACT OF THE DISCLOSURE

An electrical conductor having superconducting properties comprising a plurality of continuous superconductor elements each having a mean thickness of less than 25 microns, and electrical insultion material electrically insulating substantially all of the elements one from another, from 0 to 30 percent by weight of the conductor being constituted by electrically conductive noncoductive non-superconductor material.

This is a division of application, Ser. No. 722,475, filed Apr. 18, 1968.

BACKGROUND OF THE INVENTION

This invention relates to electrical conductors having superconducting properties, and is particularly, but not exclusively, concerned with such conductors which are intended for the transmission of electrical currents having an alternating component rather than direct currents alone.

Various proposals have been made to manufacture electrical conductors having superconducting properties at cryogenic temperatures, i.e. of the order of the boiling point of helium, which is about 4.2 K. Examples of such proposals can be found in our co-pending cognated patent applications Nos. 3,757/66 and others (Ser. No. 611,662). These superconductors are particularly designed for the transmission of direct current, but when attempts are made to use them for transmitting alternating current with an alternating component, high losses in power are observed.

It is an object of the invention to provide an electrical conductor having superconducting properties which will satisfactorily conduct currents having alternating components.

SUMARY OF THE INVENTION

In accordance with the invention an electrical conductor having superconducting properties comprises a plurality of continuous superconductor elements each having a mean thickness of less than 25 microns, and electrical insulation material electrically insulating substantially all of the elements one from another, from 0 to 30 percent by weight of the conductor being constituted by electrically conductive non-superconductor material.

Preferably the means thickness of each superconductor element is less than 20 microns.

Preferably also the mean thickness of each superconductor element is from 5 to 10 microns.

Preferably further the electrical insulation material is an oxide of the superconductor material, but alternatively the electrical insulation material can be "Formvar" or magnesia or alumina.

Preferably further the superconductor elements are twisted about the axis of the conductor.

In accordance with the invention also, a method of manufacturing an electrical conductor comprises locating a billet of a ductile superconductor material in a can of a ductile non-superconductor material, working the can with the billet to produce a superconductor rod clad with the ductile non-superconductor material, cutting the rod into lengths, stacking the lengths in another can of a ductile superconductor material to from an assembly, working the assembly to produce a multi-core composite wire containing elements of the superconductor material in a matrix of the ductile non-superconductor material, removing the ductile non-superconductor material from the elements with each element having a mean thickness of less than 25 microns, and insulating the elements one from another.

Preferably, the ductile non-superconductor material has an unworked hardness closer than that of copper to the unworked hardness of the superconductor material, and after 90% cold working has a hardness within 30 Vickers hardness numbers of the hardness of the superconductor material after 90% cold working, in which case preferably the multi-core composite wire is cut into lengths, the lengths are stacked in a further can of the ductile superconductor material to form a further assembly, and the further assembly is worked to produce another multi core composite wire, and this process of cutting, staking, and working is repeated at least once prior to the removal of the ductile non-superconductor material.

Preferably also the superconductor elements are fabricated from a superconducting niobium-titanium alloy, for example niobium 44 wt. percent titanium or niobium 67 wt. percent titanium, but the superconductor material can be any one of the metals niobium, hafnium, tantalum, zirconium and titanium, or superconducting alloys containing one or more of these metals. As a further alternative, the superconductor elements are of a superconducting inter-metallic compound, for example $Nb_3Sn$.

It is thought that, by maintaining the mean diameter of thickness of the supercondcutor elements less than 25 microns, the flux of the alternating current will be able to penetrate and leave the superconductor material more easily because of the thinness thereof, and this should be particularly so in relatively low frequency alternating currents, e.g. of the order of 2–50 cycles per second. In addition there will be a minimum of superconductor material in which eddy currents can be induced and losses thereby produced. By insulating the superconductor elements one from another, there will be no tendency for there to be a conglomeration of elements which would effectively magnify the thickness of the superconductor material to be penetrated by the flux. At the same time, by having up to 30%, or preferably up to 10%, of or no electrically conductive non-superconductor material magnetically coupled with the superconductor elements, losses due to the induction of eddy currents in such non-superconductor material should be reduced to a minimum if there is only this small amount of that material present, and there should be no eddy currents whatsoever outside the elements if there is no such material. In this way the energy losses which have been found experimentally by virtue of the alternating nature of the current being transmitted are reduced.

BRIEF DESCRIPTION OF THE DRAWINGS

Typical examples of the conductor of the present invention, and methods of manufacture thereof, will now be described with reference to the accompanying drawings, in which.

DESCRIPTION OF THE PREFERRED EMBODIMENTS

Figure 1:
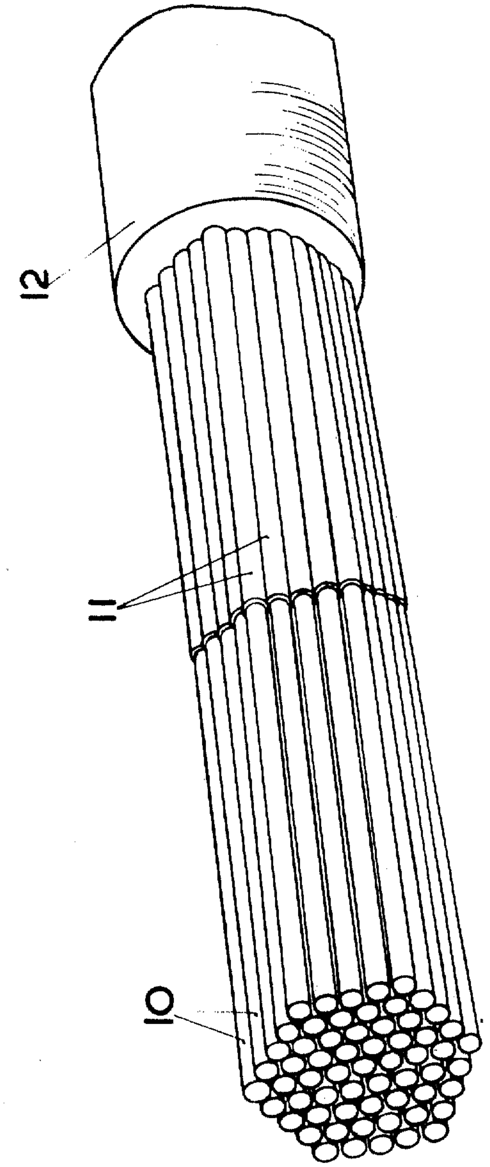
FIG. 1 is a partly cut-away perspective view of a finished conductor according to a first example.
Figure 2:
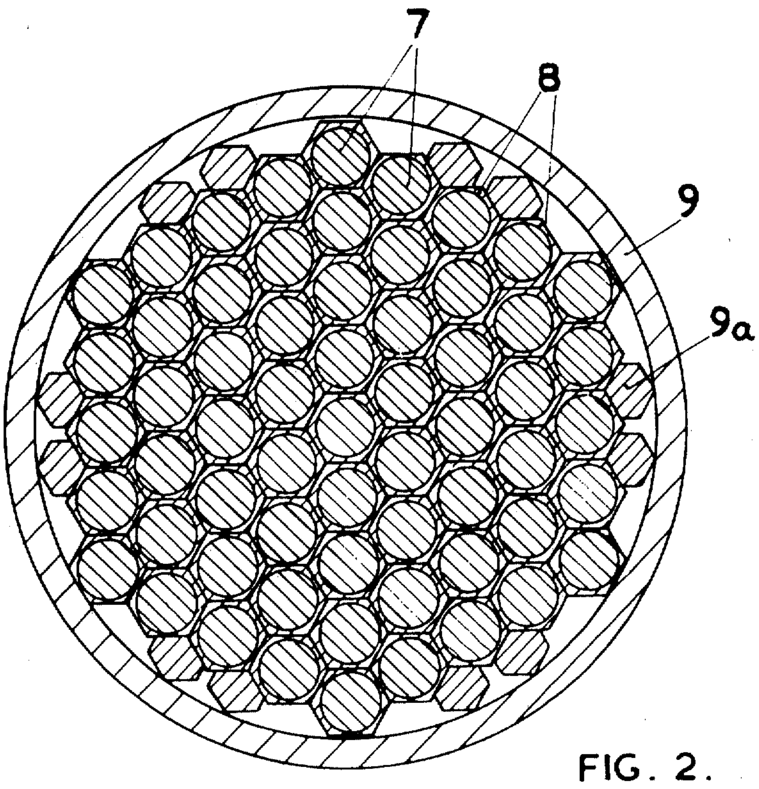
FIG. 2 is an end view of the conductor of FIG. 1 in an early processing stage.
Figure 3:
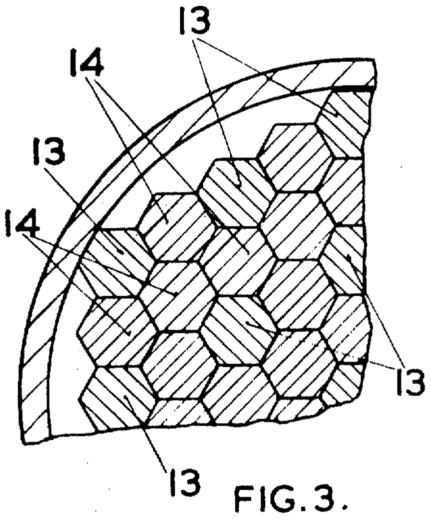
FIG. 3 is a diagrammatic end view of part of the conductor of FIG. 1 in an early processing stage.

Referring to the drawings, and initially to FIGS. 1, 2 and 3, in a first example of the electrical conductor of the invention, an electrically conductive non-superconductor material is used directly in conjunction with the superconductor material during the primary processing steps. Thus, a billet of the ductile superconductor alloy niobium 44 wt. percent titanium, is located in a copper can which is evacuated and sealed, extruded at 500° C. and drawn at room temperature, or merely drawn firstly at from room temperature up to 250° C. and then at room temperature to produce a superconductor rod 7 clad with copper 8. This rod, which is conveniently hexagonal in cross-section, is cut into 61 lengths which are stacked in another copper can 9 to produce the assembly shown in FIG. 2. The assembly contains some packing pieces **9*a***. This assembly is evacuated and sealed and is then extruded at 500° C. and drawn at room temperature to produce a multi-core composite rod which is a copper matrix containing the 61 superconductor elements. This rod is repeatedly drawn at room temperature for as many times as are necessary to finally produce a wire which is a copper matrix including a large number of continuous filaments of the superconductor alloy, each filament having a diameter less than 25 microns.

If required, the assembly of 61 lengths of copper-clad superconducting elements shown in FIG. 2 can be replaced by the stacking of a number of bars 13 of superconductor material and a number of bars 14 of copper in the copper can, as shown diagrammatically in FIG. 3, followed by the bars 13 being spaced apart by the copper bars 14, evacuation, sealing, extrusion and drawing as described above.

The wire is then twisted typically at the rate of one complete turn per inch to hold the eventual filaments together, and to ensure that each filament is subject to approximately the same magnetic flux when in use, as is usual practice in the electrical conductor art.

The wire is then processed to remove the copper and expose the continuous filaments. This can be done by pickling in nitric acid. The filaments are then insulated one from another by oxidising in air or by anodising in a bath of 10–15 vol. percent sulphuric acid, or perhaps even by complete and agitated immersion in a liquid insulating material such as that available under the trade mark "Formvar," which is subsequently dried or cured.

This resulting wire typically has an overall diameter of about 0.003 inch with filament diameters of about 10 microns, and is provided with additional strength and insulation by dipping in an insulating material, for example "Formvar."

FIG. 1 shows the wire so produced in a partly cut-away manner, each filament 10 having an oxide or other insulating coating 11 electrically insulating it from its neighbours, being twisted at the rated of one turn per inch, and the twisted elements being strengthened and further insulated by further insulation material 12.

In a second example of a conductor of the invention, the use of copper described in the first example is replaced by the use of a ductile material which has similar working characteristics to those of the superconductor alloy. Thus a metal is used which has a hardness closer to that of the superconductor alloy than copper in the unworked state, and of which the hardness is within 30 Vickers hardness numbers after 90% cold workng. For niobium 44 wt. percent titanium, typical metals are cupro-nickel alloys, nickel silver alloys and brass for which the hardness figures are given with those of copper and the superconductor alloy in the following Table I, viz:

TABLE I

| Metal | Vickers Hardness Numbers | |
|---|---|---|
| | Without working | After 90% cold working |
| Oxygen-free high conductivity copper | 52 | 128 |
| Nb 44 wt. percent Ti | 180 | 197 |
| Cu 20 wt. percent Ni | 90 | 180 |
| Cu 30 wt. percent Ni | 90 | 197 |
| Cu 10 wt. percent Ni 27 wt. percent Zn | 70 | [1] 210 |
| Cu 20 wt. percent Ni 20 wt. percent Zn | 80 | [1] 210 |
| Cu 30 wt. percent Zn | 65 | 180–190 |

[1] Approximate.

Using such a metal, typically the cupro-nickel alloy copper 300 wt. percent nickel, the assembly of FIG. 2 is produced in the same way as that described in the first example, with the exception that extrusion temperatures of 570° C. are used. This assembly is then evacuated, sealed, extruded at 570° C. and drawn at room temperature to produce a rod having approximately the same diameter as that of the clad rods used in the assembly of FIG. 2. This rod is then cut into lengths, and typically 61 lengths are stacked in a cupro-nickel can of the same alloy. This is then evacuated, sealed and worked, and this procedure continued until the superconductor filaments have reached a thickness of about 5 microns.

In this way there is produced a wire which contains a far larger number of superconductor filaments which can be of a smaller size than when copper is used, and this is accomplished satisfactorily because of the good support given to the superconductor by the use of a metal having similar working characteristics to those of the superconductor.

Further processing is carried out as for the first example, i.e. twisting, pickling and insulating.

In a modification of the second example, the niobium 44 wt. percent titanium billet is provided with a coating of aluminum to the extent of about 5% by weight of the billet. This can be provided by inserting an aluminium tube between the niobium-titanium billet and the cupro-nickel can.

The assembly is then processed in the manner described up to and including pickling, but the nitric acid will leave the superconductor filaments with a coating about one micron thick of aluminum. The aluminum is then anodised to an insulating alumina coating in a bath of 15 vol. percent sulphuric acid at 19–25° C. with a current density of about 1.3 amps/dm.$^2$.

It will be appreciated that, in the examples described above, the final product contains no electrically conductive non-superconductor material, so that there will be no losses through eddy current induction in such material during the conduction of currents having AC components.

In a third example of the invention, a powdery insulating material is used in a co-processing manufacturing route, whereby, as an example, an array of bars of superconductor material, again, as an example, the niobium 44 wt. percent titanium superconducting alloy, is inserted in a container of a ductile material, such as copper, brass or steel. The container only serves to contain, so that it is as thin as possible and is arranged not to exceed 30% and preferably not 10% of the weight of the finished conductor, whereby the losses through the inductance of eddy currents therein when the conductor is passing current having AC components are minimised. The interior of the container is then packed with insulating material in between the superconductor bars, examples of the insulating material being magnesia, alumina, talcum powder, molybdenum sulphide, resin, wax or plastics materials, which in this example are in a finely powdered form. Other powders may well be satisfactory, but they must not be abrasive because the resulting filaments are so thin that they are of a relatively fragile nature.

Figure 4:
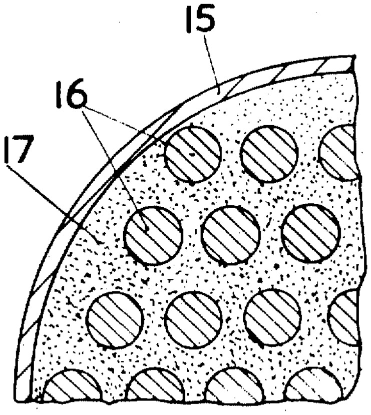
FIG. 4 is a diagrammatic end view of part of a conductor according to a third typical example in an early processing stage.

The resulting assembly is shown in FIG. 4 in which typically the container 15 is of copper, the superconductor bars 16 are of the alloy niobium 44 wt. percent titanium, and the insulating material 17 is magnesia.

The container is then sealed and working is carried out by extruding and/or swaging and/or rolling and/or drawing in any suitable combination and at whatever temperatures are deemed to be desirable from the points of view of the work-hardening of the metallic materials through working, the desired superconducting properties of the superconductor elements, and the properties of the insulating matreial.

Drawing can be continued to reach the required filamentary size, i.e. less than 25 microns and typically about 5–10 microns for the mean diameter of the superconductor filaments, of which each is surrounded by a continuous layer of insulating material.

In a modification of the examples described above, the conductor is arranged to be tubular so as to have a central conduit for containing and transmitting the liquid helium coolant employed when the conductor is used. Thus in the first and second examples the final assembly is carried out around a tube of a ductible material which is unaffected by the processes subsequently utilised for the removal of the matrix material; if the matrix material is copper which is to be pickled off with nitric acid, the ductile material can be aluminium as an example. If the superconducting filaments are provided with the coating of aluminium which is to be anodised to alumina for insulation, the use of the aluminium tube produces an insulating alumina coating on the tube. For the third example described above, the array of bars of superconducting material is inserted in the container around a central tube, and in this case, as also for this modification of the first and second examples, the weight of the non-superconductor electrically conductive material is arranged so as not to exceed 30% of the weight of the finished conductor.

We claim:

1. A method of manufacturing an electrical conductor comprising locating a billet of a ductile niobium-titanium superconductor material in a can of a ductile non-superconductor material selected from the group consisting of copper-nickel, copper-zinc and copper-nickel-zinc alloys, working the can with the billet to produce a superconductor rod clad with the ductile non-superconductor material, cutting the rod into lengths, stacking the lengths in another can of a ductile superconductor material to form an assembly, working the assembly to produce a composite wire containing elements of the superconductor material in a matrix of the ductile non-sueprconductor material wherein each element has a mean thickness of less than 25 microns, twisting the composite wire about its axis, then removing the ductile non-superconductor material from said elements and thereafter insulating the elements one from another, said ductile non-superconductor material having an unworked hardness closer than that of copper to the unworked hardness of the superconductor material, and after 90% cold working having a hardness within 30 Vickers hardness numbers of the hardness of the superconductor material after 90% cold working.

2. A method according to claim 1 wherein the elements are insulated one from another by oxidizing in air.

3. A method according to claim 1 wherein the elements are insulated one from another by anodizing.

4. A method according to claim 1 wherein the elements are insulated one from another by complete and agitated immersion in a liquid insulating material, followed by drying or curing the insulation.

5. A method of manufacturing an electrical conductor according to claim 1 wherein the insulated elements are provided with a dip coating of an insulating material.

6. A method according to claim 1 wherein the multicore composite wire is cut into lengths, the lengths are stacked in a further can of the ductile superconductor material to form a further assembly, and the further assembly is worked to produce another multi-core composite wire, and this process of cutting, stacking, and working is repeated at least once prior to the removal of the ductile non-superconductor material.

7. A method according to claim 6 wherein the billet of superconductor material is provided with a coating of aluminium to the extent of about 5 percent by weight of the billet, and after removal of the ductile non-superconductor material, the elements are anodised to convert the aluminium coating into an insulating alumina coating on the superconductor elements.

References Cited

UNITED STATES PATENTS

| | | | |
|---|---|---|---|
| 2,050,298 | 8/1936 | Everett | 29—419 X |
| 3,131,469 | 5/1964 | Glaze | 29—599 UX |
| 3,218,693 | 11/1965 | Allen et al. | 29—599 |
| 3,277,564 | 10/1966 | Webber et al. | 29—419 |
| 3,370,347 | 2/1968 | Garwin et al. | 29—599 |
| 3,394,213 | 7/1968 | Roberts et al. | 29—419 X |

JOHN F. CAMPBELL, Primary Examiner

D. C. REILEY, Assistant Examiner

U.S. Cl. X.R.

29—419, 423; 174—126 R, DIG. 6